United States Patent
Hoeptner

(10) Patent No.: US 8,333,364 B1
(45) Date of Patent: Dec. 18, 2012

(54) STOPPER ELASTOMERIC SLEEVE ASSEMBLY INTO STANDARD VALVE

(76) Inventor: Herbert W. Hoeptner, Gilroy, CA (US)

(*) Notice: Subject to any disclaimer, the term of this patent is extended or adjusted under 35 U.S.C. 154(b) by 528 days.

(21) Appl. No.: 12/462,328

(22) Filed: Aug. 3, 2009

Related U.S. Application Data

(63) Continuation-in-part of application No. 12/288,763, filed on Oct. 24, 2008.

(51) Int. Cl.
*F16K 5/00* (2006.01)
(52) U.S. Cl. .................. 251/310; 251/344
(58) Field of Classification Search ............ 137/454.5; 251/344, 310, 309, 312
See application file for complete search history.

(56) References Cited

U.S. PATENT DOCUMENTS

| | | | | |
|---|---|---|---|---|
| 313,549 A | * | 3/1885 | Stebbins | 137/454.6 |
| 3,166,097 A | * | 1/1965 | Hinderer et al. | 137/625.17 |
| 4,365,646 A | * | 12/1982 | Sandling | 137/375 |
| 4,395,018 A | * | 7/1983 | Moen | 251/310 |
| 4,562,994 A | * | 1/1986 | MacDonald | 251/175 |
| 4,577,656 A | * | 3/1986 | Beltran | 137/375 |
| 4,699,358 A | * | 10/1987 | Iqbal | 251/310 |
| 5,623,966 A | * | 4/1997 | Rodger | 137/625.32 |
| 6,349,709 B1 | * | 2/2002 | Evert et al. | 123/585 |

* cited by examiner

*Primary Examiner* — John K Fristoe, Jr.
*Assistant Examiner* — Andrew J Rost
(74) *Attorney, Agent, or Firm* — William W. Haefliger

(57) ABSTRACT

In a valve, the combination comprises a valve body defining an annular seat, and porting at upstream and downstream sides of the seat; a valve operating handle and stem; a tubular part connected into the body and defining a first side opening facing toward one of the sides; a tubular stopper sleeve received within the tubular part and having an open end projecting through a seat defined opening; and a second side opening rotatable by the stem into and out of registration with the first side opening whereby flow through the valve and stopper sleeve is established when the second side opening registers with the first side opening, and flow through the valve is blanked when the second side opening is rotated out of registration with the first side opening.

7 Claims, 3 Drawing Sheets

STOPPER ELASTOMERIC SLEEVE ASSEMBLY INTO STANDARD VALVE

This application is a continuation-in-part of prior pending application Ser. No. 12/288,763, filed Oct. 24, 2008.

BACKGROUND OF THE INVENTION

This invention relates generally to valves such as faucet type valves, and more particularly to valves which will turn full on and full off in response to turning of a handle through an angle less than one 360° full turn, and typically less than or about one quarter turn, i.e. 90°.

There is need for improvements in such valves, and particularly over ball valves, which inherently are difficult to seal and/or seat in open and/or closed positions. Such valves tend to leak due to their ball configurations. There is need for improvements in faucet type valves, generally, and which include stoppers that seat and/or seal in open and/or closed positions after less than 180° rotation; and there is need for improvements in structure, function and results are now provided by the valve disclosed herein.

SUMMARY OF THE INVENTION

It is a major object of this invention to provide an improved valve meeting the needs as referred to above. Basically, the improved valve includes:

a) a valve body defining an annular seat, and porting at upstream and downstream sides of the seat, b) a valve operating handle and stem, c) a tubular part connected into the body and defining a first side opening facing toward one of said sides, d) a tubular stopper sleeve received within the tubular part and having i) an open end projecting through a seat defined opening, ii) a second side opening rotatable by the stern into and out of registration with said first side opening, e) whereby flow through the valve and stopper sleeve is established when said second side opening registers with said first side opening, and flow through the valve is blanked when said second side opening is rotated out of registration with said first side opening, f) said sleeve having a forward end portion projecting through said annular seat when the sleeve engages the seat to close the valve.

Such a combination is well suited for installation into a faucet body after removal of a ball stopper, to provide better valve functioning.

Another object is to provide an improved valve configuration as referred to, wherein the sleeve stem including said forward end portion consists of an elastomeric material, providing enhanced sealing surface area.

Yet another object is to provide a valve wherein the stopper sleeve is carried by or integral with the turnable stem of the valve. In this regard, a metallic insert is typically provided within a tubular elastomeric upper end portion of the sleeve.

A further object is to provide a valve having an elastomeric stopper sleeve as referred to, which is turnable between open and closed positions in response to about ¼ turning of the rotatable valve stem, and provides for good sealing of the sleeve in open and closed positions.

An additional object is to provide a valve of the type described, and characterized by simplicity and reliability in structure and function.

A further object includes assembling the referenced stopper sleeve into the body of a valve that defines an interior annular seat, not needed for sleeve sealing, and to allow flow passage through that seat into the sleeve, for flow control.

These and other objects and advantages of the invention, as well as the details of an illustrative embodiment, will be more fully understood from the following specification and drawings, in which:

DRAWING DESCRIPTION

DETAILED DESCRIPTION

Figure 1:
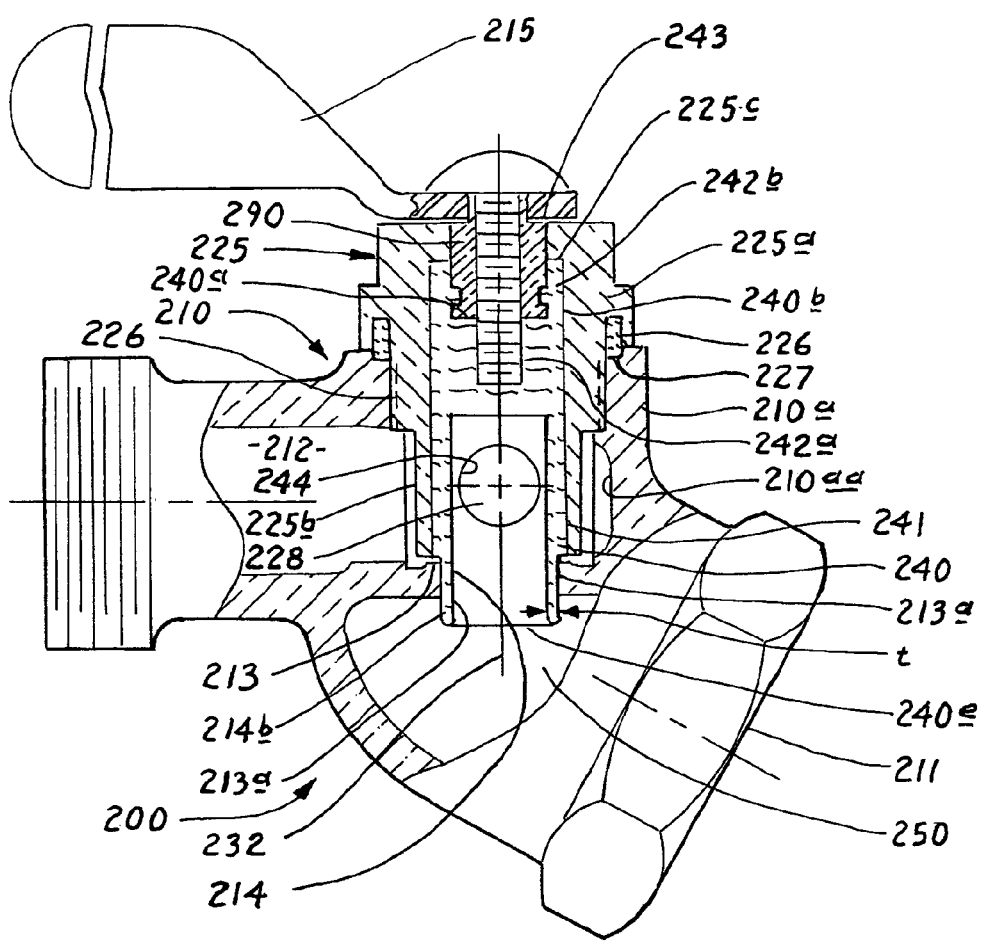
FIG. 1 is a vertical section taken through a preferred and improved valve embodying the invention.
Figure 2:
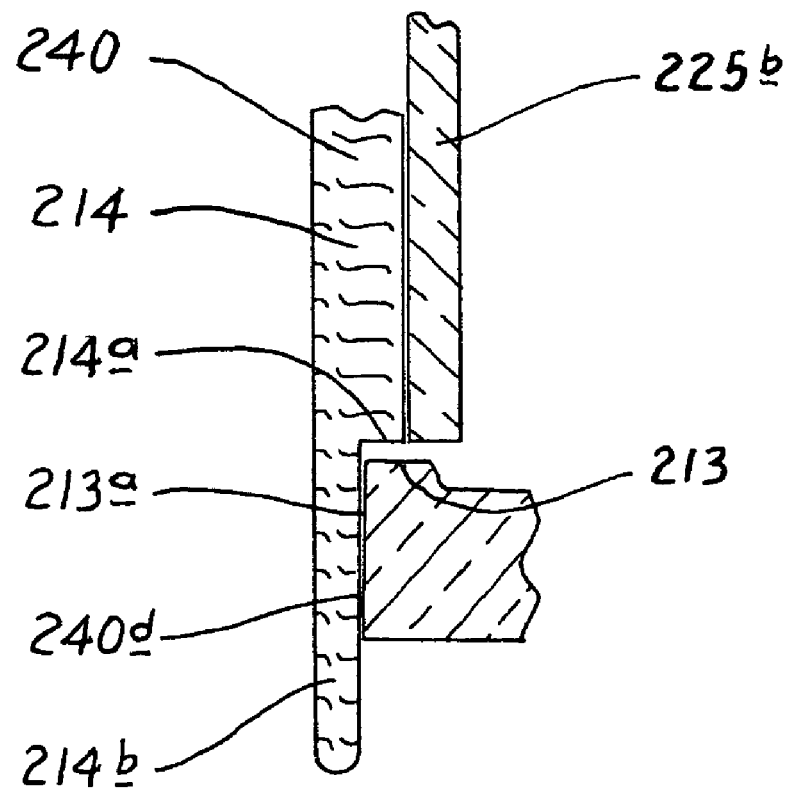
FIG. 2 is an enlarged section taken through the stopper sleeve and seat, with elements in closed position.
Figure 3:
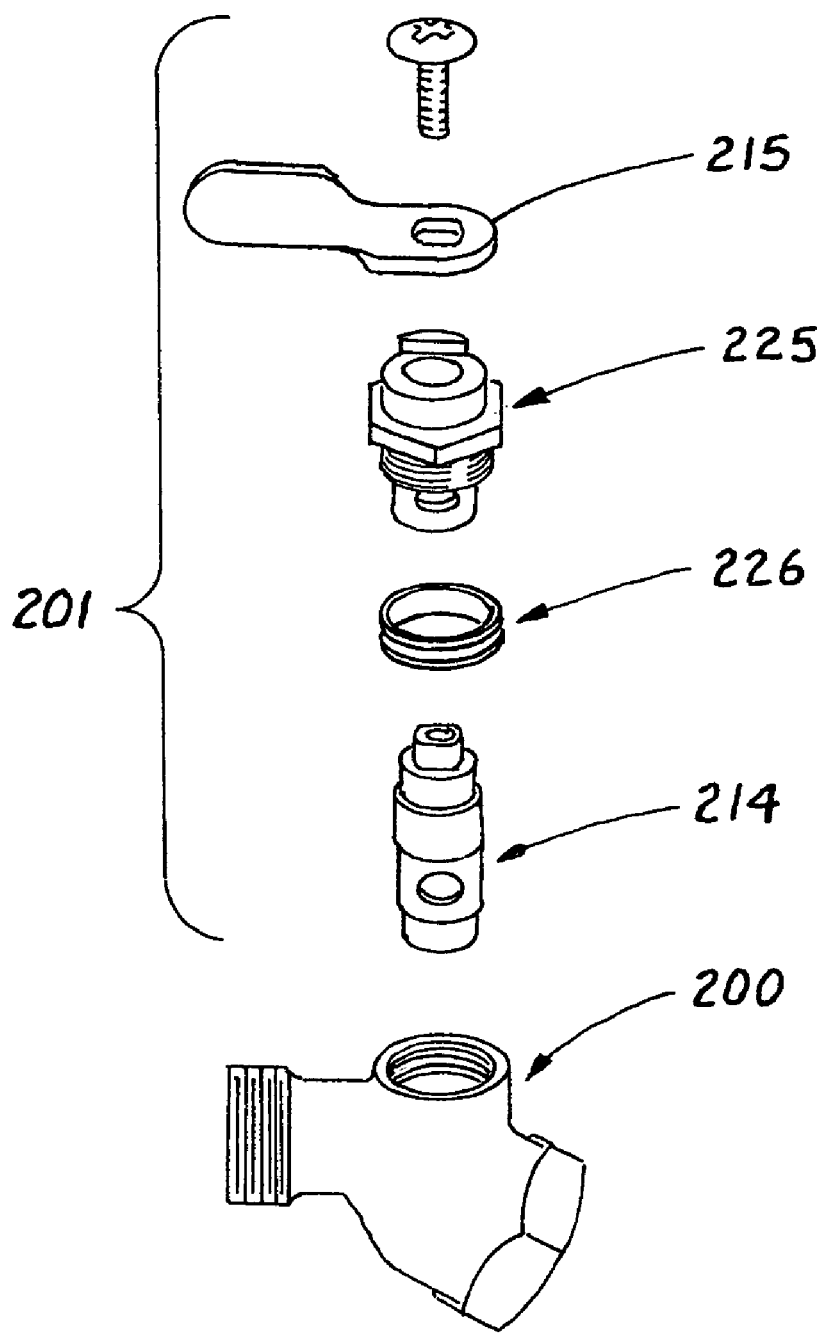
FIG. 3 is an exploded view showing valve parts.

In FIGS. 1 and 3, the illustrated valve 200 includes a valve body 210 having inlet and outlet ports 211 and 212 and an annular seat 213. See also FIG. 2. That seat, in a valve 200 as shown in FIG. 2, may be engagable, or not, by a shoulder 214a of an elastomeric sleeve 214. A forward tubular portion 214b of reduced thickness "t" of the sleeve remains projecting downwardly through an opening 213a in body 210 bounded by the seat. A 90° turn of handle 215 in FIG. 1 is required to turn the sleeve so as to achieve full flow between valve ports 211 and 212. Further, stopper sleeve 214 and its turning handle and element 225 and 215 and washer 226 can be substituted into an existing valve, to convert it into an improved valve, fully openable by one quarter turn of the handle. See FIG. 3, bracket 201.

Referring again to FIGS. 1 and 2, a tubular part 225 is threadably connected at 226 into the valve body part 210a, and an annular seal is retained at 226 between head 225a of 225, and the body shoulder 227. Part 225 has a tubular extension 225b that extends downwardly into body chamber 210aa, with the lower annular end of 225b extending proximate seat 213, for orientation. Extension 225b defines a first side wall through opening 228 facing toward one of the valve body flow passages or sides, when the valve is open.

As shown, a tubular stopper sleeve 240, typically elastomeric, is provided within a chamber or cavity or bore 241 within extension 225b, and in coaxial relation therewith. The upper end of the sleeve is closed by end wall 240a, and stem structure 242a and 242b connects with the handle 215, as at 243. A metallic tubular stiffening insert 290 is received within the sleeve upper extension 240b, and connects between 240a and 243. An annular sealing part 242b of 225 is located to upwardly seal against the upper end wall 225c of 225. The stopper elastomeric sleeve is sealingly rotatable in bores 241 and 240d by the handle, and preferably ¼ turn (90°), to open and close the valve.

The sleeve has a second side wall through opening 244 rotatable into and out of registration with the first side opening 228. Those two openings may preferably be circular, and of the same general size. In valve closed position, the openings are out of registration, and opening 244 is blanked by the cylindrical bore of the extension 225b. As seen in FIG. 2, the sliding fit between the bore 240d and the outer cylindrical surface of elastomeric lower reduced outer diameter tubular projection 240d of the sleeve part 240 (expanded by water pressure) is sufficiently close as to prevent objectionable leakage, in closed position as seen in FIG. 2, but without inhibiting turning of the sleeve. Sleeve 240 may consist of a relatively hard elastomer, and tubular part 225 and sealing bore 213a may consist of metal, such as brass. Other metals or plastics are usable.

The bottom end at 240*e* of the sleeve is open, as shown, to transmit flow to or from body passage 250; and sleeve tubular projection 240*d* extends closely within the standard valve seat opening 213*a*. The bore 213*c* is large enough to pass flow without substantial restriction.

Accordingly, flow through the valve and substituted stopper sleeve is established when said second side opening 244 registers with first side opening 228, and flow through the valve is blanked when side opening 244 is rotated 90°, or about 90°, into valve closing position.

What is claimed is:

1. In a valve, the combination comprising
   a) a valve body defining an annular seat, and porting at upstream and downstream sides of the seat,
   b) a valve operating handle and stem,
   c) a tubular part connected into the body and defining a first side opening facing toward one of said sides,
   d) a pressure expansible elastomeric tubular stopper sleeve received within and rotatable relative to the tubular part in contact therewith and having
      i) an open end projecting through a seat defined opening,
      ii) a second side opening rotatable by the stem into and out of registration with said first side opening,
   e) whereby flow through the valve and stopper sleeve is established when said second side opening registers with said first side opening, and flow through the valve is blanked when said second side opening is rotated out of registration with said first side opening,
   f) said sleeve having a forward end portion projecting through said annular seat when the sleeve engages the seat to close the valve,
   g) a handle controlled rotary connector captivated axially into an end portion of the elastomeric sleeve spaced axially from said side openings,
   h) the sleeve having a closed end operatively connected with said stem, to be rotated by the handle about an axis passing through an opening defined by the seat,
   i) the sleeve defining a cylinder having an annular shoulder that engages the seat.

2. The combination of claim 1 wherein the sleeve including said forward end portion consists entirely of an elastomer.

3. The combination of claim 1 including an upper seal between said tubular part and said body, spaced outwardly from the upper end of said sleeve.

4. The combination of claim 1 wherein the sleeve and said part remain co-axial in all positions of the sleeve.

5. The combination of claim 1 wherein the sleeve has an upper extension, there being a metallic member bounded by said upper extension, and located above said sleeve closed end.

6. The method that includes providing the combination of claim 1, and also including the step of adjusting the position of said part in said body, and relative to said body, thereby to position the sleeve open end in proximity to said seat, but out of sealing engagement therewith.

7. The combination of claim 1 wherein the sleeve has a closed position in which said sleeve side opening is blanked by a side wall of said part, and an open position wherein the sleeve side opening is in registration with said part side opening.

\* \* \* \* \*